United States Patent
Pan et al.

(10) Patent No.: US 8,570,976 B2
(45) Date of Patent: Oct. 29, 2013

(54) METHOD AND SYSTEM FOR FAST HANDOVER IN HIERARCHICAL MOBILE IPV6

(75) Inventors: Xuezeng Pan, Shenzhen (CN); Jun Guan, Shenzhen (CN); Lingdi Ping, Shenzhen (CN); Jiong Chen, Shenzhen (CN); Defeng Li, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 1465 days.

(21) Appl. No.: 12/197,412

(22) Filed: Aug. 25, 2008

(65) Prior Publication Data
US 2008/0310369 A1   Dec. 18, 2008

Related U.S. Application Data

(63) Continuation of application No. PCT/CN2006/003234, filed on Nov. 30, 2006.

(30) Foreign Application Priority Data

Feb. 23, 2006 (CN) .......................... 2006 1 0007895

(51) Int. Cl.
*H04W 4/00* (2009.01)
*H04L 12/66* (2006.01)
*H04L 12/28* (2006.01)

(52) U.S. Cl.
USPC ........... 370/331; 370/352; 370/338; 370/401; 370/389; 370/412

(58) Field of Classification Search
USPC ......................................................... 370/331
See application file for complete search history.

(56) References Cited

U.S. PATENT DOCUMENTS

| 4,223,502 A | 9/1980 | Robinson |
| 2004/0218566 A1 | 11/2004 | Han |

(Continued)

FOREIGN PATENT DOCUMENTS

| CN | 1568044 A | 1/2005 |
| CN | 1595912 A | 3/2005 |
| CN | 1596023 A | 3/2005 |
| EP | 1 473 901 A2 | 11/2004 |

OTHER PUBLICATIONS

Jung et al., "Fast Handover for Hierarchical MIPv6 (F-HMIPv6)," *Internet Engineering Task Force (IETF) Draft*, p. 1-18 (Oct. 2005) http://draft-jung-mipshon-fmipv6-00.txt.

(Continued)

*Primary Examiner* — Noel Beharry
(74) *Attorney, Agent, or Firm* — Leydig, Voit & Mayer, Ltd.

(57) ABSTRACT

A method and system for fast handover in hierarchical mobile IPv6 includes: a mobile node which transmits a proxy route request message to a previous access router of the mobile node according to a handover expectation provided by the link layer, the previous access router transmits a network prefix information of a new access router of the mobile node to the mobile node; the mobile node which generates new care-of address according to the network prefix information; after the mobile node moves to a target network, an optimistic duplicate address detection is performed on the care-of address. The disclosure can simplify the handover procedure of hierarchical mobile IPV6 of the mobile node, reduce the signaling interaction in handover process, and shorten handover delay.

12 Claims, 3 Drawing Sheets

(56) References Cited

U.S. PATENT DOCUMENTS

| | | | |
|---|---|---|---|
| 2004/0223502 A1 | 11/2004 | Wybenga et al. | |
| 2004/0228335 A1* | 11/2004 | Park et al. | 370/352 |
| 2005/0036471 A1* | 2/2005 | Singh et al. | 370/338 |
| 2005/0047372 A1 | 3/2005 | Yano et al. | |
| 2005/0053011 A1 | 3/2005 | Ohbayashi et al. | |
| 2006/0198372 A1* | 9/2006 | Lee | 370/389 |

OTHER PUBLICATIONS

Soliman et al., "Hierarchical Mobile IPv6 Mobility Management (HMIPv6); RFC 4140," *Internet Engineering Task Force (IETF) Draft*, p. 1-29 (Aug. 2005).

Written Opinion of the International Searching Authority in corresponding PCT Application No. PCT/CN2006/003234 (Mar. 15, 2007).

International Search Report in corresponding PCT Application No. PCT/CN2006/003234 (Mar. 15, 2007).

Bagnulo et al., "Random generation of interface identifiers," Internet Draft, Jan. 29, 2002, The Internet Society, Reston, Virginia.

Flarion et al., "Hierarchical Mobile IPv6 mobility management (HMIPv6)," Internet Draft, Dec. 2004, The Internet Society, Reston, Virginia.

Johnson et al., "RFC 3775—Mobility Support in IPv6," Jun. 2004, The Internet Society, Reston, Virginia.

Koodli, "Fast Handovers for Mobile IPv6," Internet Draft, Mar. 1, 2003, The Internet Society, Reston, Virginia.

Moore, "Optimistic Duplicate Address Detection for IPv6," Internet Draft, Feb. 13, 2005, The Internet Society, Reston, Virginia.

Narten et al., "RFC 2461—Neighbor Discovery for IP Version 6 (IPv6)," Dec. 1998, The Internet Society, Reston, Virginia.

Nelson et al., "Implementation of Hierarchical Mobile IPv6 for Linux.," Center for Telecommunications and Information Engineering, Oct. 18, 2002, Monash University, Melbourne, Australia.

Thomson et al., "RFC 2462—IPv6 Stateless Address Autoconfiguration," Dec. 1998, The Internet Society, Reston, Virginia.

\* cited by examiner

METHOD AND SYSTEM FOR FAST HANDOVER IN HIERARCHICAL MOBILE IPV6

CROSS-REFERENCE TO RELATED APPLICATION

This application is a continuation of International Patent Application No. PCT/CN2006/003234, filed Nov. 30, 2006, which claims priority to Chinese Patent Application No. 200610007895.7, filed Feb. 23, 2006, each of which is hereby incorporated by reference in its entirety.

TECHNICAL FIELD OF THE INVENTION

The disclosure relates generally to the technical field of network communication, and more particularly, to a method and system for fast handover in hierarchical mobile IPv6.

BACKGROUND OF THE INVENTION

To fulfill increasing mobile requirements of network equipment, Internet Engineering Task Force (IETF) proposed a Mobile IPv6 (MIPv6) protocol. IETF then proposed improved MIPv6 protocols, such as Hierarchical Mobile IPv6 (HMIPv6), Fast Mobile IPv6 (FMIPv6), and the like. The MIPv6, HMIPv6 and FMIPv6 protocols can improve the handover and communication performance of a mobile IPv6 terminal.

In Internet route mode, a route is selected according to a destination address in the Network Layer; data packets are transmitted to the network where the destination address is located; and then the data packets are transmitted to a node represented by the destination address. In order to make a mobile terminal maintain a continuous ongoing communication during the procedure of Layer 3 network handover, it is necessary to ensure that the mobility of the mobile terminal is transparent to the communication application, that is, to ensure that the IP address of the mobile terminal which is identified by the Network Layer of the communication application remains unchanged. This problem is solved by the scheme of Mobile IPv6.

Next, a general description of Mobile IPv6 will be given.

When a mobile node (MN) is in its home network, it communicates with a correspondent node (CN) in accordance with a conventional route technology using its home address, in which there needs no intervention of mobile IPv6.

When the MN moves to a foreign link, its home address remains the same; meanwhile, the MN acquires a temporary IP address (i.e. care-of address). The MN informs the home agent (HA) of the mapping between the home address and the care-of address. In this case, the communication procedure between the CN and the MN is as follows: data packets sent from the CN to the MN are still transmitted to the home network of the MN according to its home address; HA of the MN intercepts these data packets and forwards them to the care-of address of the MN via tunneling, according to the acquired mapping relationship between the home address and the care-of address. The above communication procedure is also referred to as triangular routing, where the MN communicates with the CN via its HA.

The MN can also inform the CN of the mapping relationship between the home address and care-of address, and therefore the CN acquires the care-of address of the MN and can forward data packets directly to the foreign network where the care-of address of the MN is located. In this way, the CN and the MN can communicate directly with each other. The above communication procedure is referred to as a route optimized communication procedure between the CN and the MN.

The disadvantage of the above scheme of Mobile IPv6 lies in that, when the MN hands over between access routers (ARs), the handover latency is long and the packet loss rate is high. In an actual application environment, the MN needs to hand over between neighboring ARs frequently. In this case, the MN has to register with its HA the mapping relationship between the home address and care-of address frequently, which significantly increases the burden of the HA and is very costly. Meanwhile, duplicate address detection operation is performed on the registered care-of address to verify its validity, which is quite time consuming.

Next, a brief introduction to the Hierarchical Mobile IPv6 will be given.

Based on the scheme of Mobile IPv6, Hierarchical Mobile IPv6 scheme introduces Mobility Anchor Point (MAP) to improve handover performance of the MN in the MAP domain.

When a MN enters a MAP domain, it will receive a Router Advertisement (RA) which contains MAP information. The MN needs to configure two care-of addresses, namely Regional Care-of Address (RCoA) and On-link Care-of Address (LCoA). The MN performs Duplicate Address Detection operation on the LCoA and sends a local binding update message to the MAP when the detection is successful. Upon receiving the local binding update message, the MAP performs Duplicate Address Detection operation on the RCoA as well and returns a local binding update acknowledgment message to the MN when the detection is successful. Upon receiving the local binding update acknowledgment message, the MN registers a new RCoA with its HA and the CN.

If the MN performs a handover within the MAP domain, for example, an AR is changed, then RCoA of the MN is kept the same and only LCoA of the MN is reconfigured. Duplicate Address Detection operation is performed on the reconfigured LCoA which is registered with the MAP when the detection is successful. The MAP does not need to perform Duplicate Address Detection and registration operations on the RCoA.

The disadvantage of the above scheme of HMIPv6 lies in that, though it solves, to a certain extent, the problem of long handover latency for handover within the MAP domain of the MIPv6 scheme, the handover latency is still too long, compared with the requirement of network real time application. Specifically, in the HMIPv6 scheme, the latency of performing Duplicate Address Detection operation on the LCoA and RCoA during handover makes up most of the total handover latency.

Next, a brief introduction to Fast Handover for Mobile IPv6 is given.

Fast Handovers for Mobile IPv6 is a scheme for improving the capability that a Mobile IPv6 node fast switches access points on the network. This scheme reduces or eliminates the latency of the MN establishing a new communication path and reduces the handover latency and the packet loss rate when the MN hands over across regions. In this scheme, before the MN is switched to a new link, it first initiates a handover procedure to acquire the care-of address of the new link beforehand. The handover procedure is realized by exchanging newly-added messages between the new and previous ARs as well as between the AR and the MN. This scheme requires that the MN is previously aware of the new link to which it will be moved, and therefore it requires support from Layer 2.

Next, a brief description on Hierarchical-based Fast Handover for Mobile IPv6 is given.

The Hierarchical-based Fast Handover for Mobile IPv6 is a scheme in which the scheme of HMIPv6 is combined with the scheme of Fast Handover for Mobile IPv6.

When a MN enters a new MAP domain, it performs a registration of the MN to the MAP, HA as well as CN. Similarly, when the MN moves from a previous AR to a new AR in the domain, it also performs a local binding update course in the HMIPv6 protocol. At that time, if a fast handover is to be performed on the ongoing data session between the MN and the CN, the Hierarchical-based Fast Handover procedure for Mobile IPv6 is performed on the MN, the AR and the new MAP. The procedure includes the following steps:

Step 1: The MN acquires a link layer address or identifier information of a new AR that it requires, using a mechanism provided by the Link Layer.

Step 2: The MN transmits a Proxy Router Request message to the previous AR according to a handover expectation provided by the Link Layer. The Proxy Router Request message comprises the acquired link layer address or identifier information of the new AR.

Step 3: Upon receiving the Proxy Router Request message, the previous AR transmits a Proxy Router Advertisement message to the MN. The Proxy Router Advertisement message includes the information needed for the MN to configure the care-of address in the new AR domain, that is, the network prefix of the new AR needed for Stateless Address Configuration, or the care-of address of the new link in the case of a certain state. At this time, the new MAP should already know the network prefix and link layer address of the new AR.

Step 4: The MN transmits a Fast Binding Update message to the new MAP. The Fast Binding Update message includes the previous LCoA of the MN and the IP address of the new AR.

Step 5: Upon receiving the Fast Binding Update message from the MN, the new MAP transmits a Handover Initiate message to the new AR to establish a bidirectional tunnel. Upon receiving the Handover Initiate message, the new AR establishes a Host Route option for the previous LCoA of the MN and returns a Handover Response message to the new MAP. At this time, the bidirectional tunnel is established between the new MAP and the new AR.

Step 6: The new MAP transmits a Fast Binding Acknowledge message to the previous LCoA and the new LCoA at the same time. After that, the new MAP forwards to the new AR the data packets sent to the MN through tunneling.

Step 7: Upon detecting a Link Layer movement, the MN transmits a Fast Neighbor Advertisement message to the new AR. The new AR then transmits buffered data packets to the MN.

Step 8: The MN then performs a regular HMIPv6 operation and transmits the local Binding Update to the new MAP. Upon receiving the Binding Update with the Source Address being the new LCoA, the new MAP stops forwarding the packets and clears the tunnel.

Step 9: The new MAP transmits to the MN a Binding Acknowledge message, which is a response to the local Binding Update message. The Binding Acknowledge message should be sent to the link address where the MN previously is located and the current link address, simultaneously.

Step 10: If the state of the Binding Acknowledge message received by the MN Failure, the handover of the MN fails and the procedure is terminated; otherwise, if it was a handover within the MAP domain, the handover of the MN is successful and the procedure is finished. If it was a handover across the MAP domains, the MN has to send a Binding Update message to the HA and all CNs. After the HA and CNs return the Binding Acknowledge message, the handover of the MN is successful and the procedure is finished.

The drawback of the above scheme of Hierarchical-based Fast Handover for Mobile IPv6 lies in that the scheme introduces a fast handover on the basis of HMIPv6, speeds up the handover procedure, but does not reduce the latency needed for performing Duplicate Address Detection operation on the LCoA and RCoA during handover; and this latency still makes up a great part of the total handover latency. Also, the Hierarchical-based Fast Handover for Mobile IPv6 involves lots of complicated technical steps and is difficult to implement.

Next, a brief introduction on Optimistic Duplicate Address Detection protocol is given.

In a practical application, a Duplicate Address Detection operation on a stateless address auto-configured care-of address will be successful. Thus, it is not worthwhile to wait a long time for success of the Duplicate Address Detection operation in most cases. This situation is improved by the Optimistic Duplicate Address Detection protocol.

The Optimistic Duplicate Address Detection protocol is a modification of the existing IPv6 Neighbor Discovery protocol (RFC 2461) and Stateless Address Auto-configuration protocol (RFC 2462); its intention is to minimize address configuration delays in the case of successful address configuration, to reduce communication disruption as far as possible in the case of failed address configuration, and to maintain interconnection of a general host with a router.

A new type of address, i.e. Optimistic address, is introduced in Optimistic Duplicate Address Detection protocol, for indicating that an address is available but no Duplicate Address Detection operation is performed on that address.

SUMMARY OF THE INVENTION

The disclosure is designed to provide a fast handover method and system for Hierarchical Mobile IPv6, which can simplify the Hierarchical Mobile IPv6 handover procedure of the mobile node, reduce the signaling interaction during handover, and shorten the handover delay.

The disclosure is realized by following technical solutions.

A fast handover method for Hierarchical Mobile IPv6 includes:

Transmitting, by a mobile node, a proxy route request message to a previous access router of the mobile node, according to a handover expectation provided by a link layer; wherein the previous access router transmits to the mobile node a network prefix information of a new access router of the mobile node; and Generating, by the mobile node, a new care-of address, according to the network prefix information; and performing an optimistic duplicate address detection on the care-of address, after the mobile node moves to a target network.

A fast handover system for Hierarchical Mobile IPv6 includes:

An access router, configured to provide a network access point to a mobile node;

A mobility anchor point, configured to support Hierarchical Mobile IPv6, process a local binding update of the mobile node and transmit a binding acknowledge message to the mobile node;

The mobile node, configured to transmit a proxy route request message to a previous access router of the mobile node using a handover expectation provided by the link layer, generates a new care-of address according to a network prefix information of the new access router, and performs an optimistic duplicate address detection on the new care-of address after the mobile node moves to a target network.

It can be seen from the technical solutions provided by the disclosure that the disclosure provides the following advantages over the prior art by improving Hierarchical Mobile IPv6 protocol and using the handover expectation provided by the Link Layer and Optimistic Duplicate Address Detection method:

1. The Hierarchical Mobile IPv6 handover procedure of the mobile node is simplified, and the signaling interaction during handover is reduced.

2. The validity of the Care-of Address is verified by use of a method for Optimistic Duplicate Address Detection, so as to eliminate the time needed for Duplicate Address Detection of standard protocol, decrease the handover delay, and satisfy requirements of real time applications.

3. Preparation for the handover using the handover expectation provided by the Link Layer is made before the handover takes place, which decreases the handover delay and satisfies requirements of real time applications.

EMBODIMENTS OF THE INVENTION

An embodiment of the disclosure provides a fast handover method and system for HMIPv6, and its essence is to improve HMIPv6, so that the handover procedure is sped up using the handover expectation provided by the Link Layer, so that the time needed for Duplicate Address Detection operation in the standard IPv6 protocol is reduced by use of method for Optimistic Duplicate Address Detection.

Figure 1:
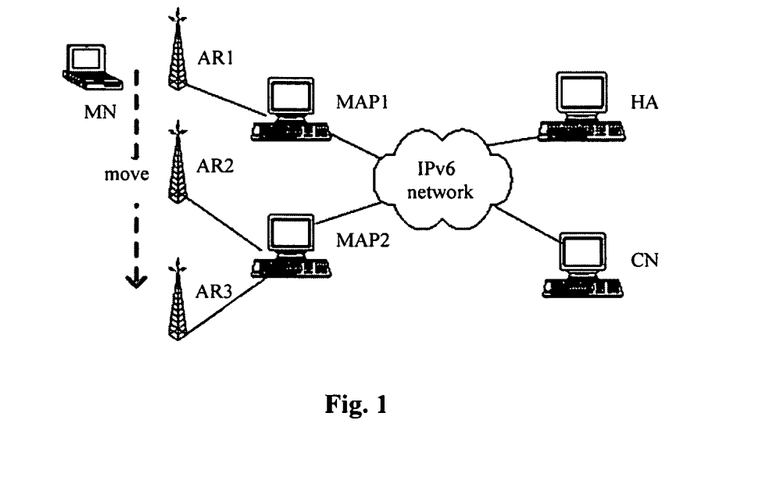
FIG. 1 shows a schematic structural diagram of an embodiment of the system according to the disclosure.

In the following, the embodiment of the disclosure is described by reference to the accompanying drawings. FIG. 1 shows a schematic structural diagram of an embodiment of the system according to the disclosure, which includes the following units:

AR: an access router of the MN configured to provide the MN with a network access point.

MAP: a mobile router of the MN configured to support HMIPv6, process the local binding update of the MN, and transmit a Binding Acknowledge message to the MN.

Figure 2:
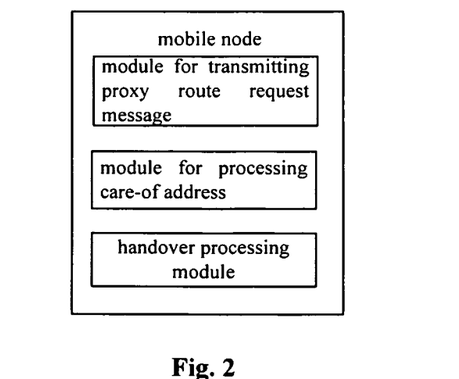
FIG. 2 shows a schematic structural diagram of an embodiment of the mobile node according to the disclosure.

MN: configured to speed up handover using the handover expectation provided by the Link Layer, transmit a Proxy Route Request message to a previous Access Router of the mobile node, generate a new Care-of Address according to the received network prefix information of the new AR, perform Duplicate Address Detection on the new Care-of Address using a method for Optimistic Duplicate Address Detection, perform a local binding with the MAP as well as binding with the HA and CN. A schematic structural diagram of an embodiment of the MN is shown in FIG. 2. The MN includes a module for transmitting proxy route request message, a module for processing care-of address, and a handover processing module.

The module for transmitting proxy route request message is configured to obtain a link layer address or identifier information of a new AR of the MN by use of a mechanism provided by the Link Layer; and transmit a Proxy Route Request message including the link layer address or identifier information of the new AR to a previous AR of the MN, according to a handover expectation provided by the Link Layer.

The module for processing care-of address is configured to generate the new Care-of Address according to the received network prefix information of the new AR, transmit a local Binding Update message to the MAP of the MN, and perform an Optimistic Duplicate Address Detection on the new Care-of Address after the MN moves to a target network.

The handover processing module is configured to determine that the handover of the MN has failed when the state of a received Binding Acknowledge message is Failure; otherwise, if it is a handover within the MAP domain, determine that the handover of the MN is finished. If it is a handover across MAP domains, the MN transmits a Binding Update message to its HA and all CNs, and it is determined that the handover of the MN is finished after receiving a Binding Acknowledge message returned from the HA and all CNs.

HA: a mobile router of the MN configured to perform binding with the MN when the MN hands over across the MAP domains.

CN: a correspondent node of the MN configured to communicate with the MN via an IPv6 network and perform binding with the MN when the MN hands over across MAP domains.

Figure 3:
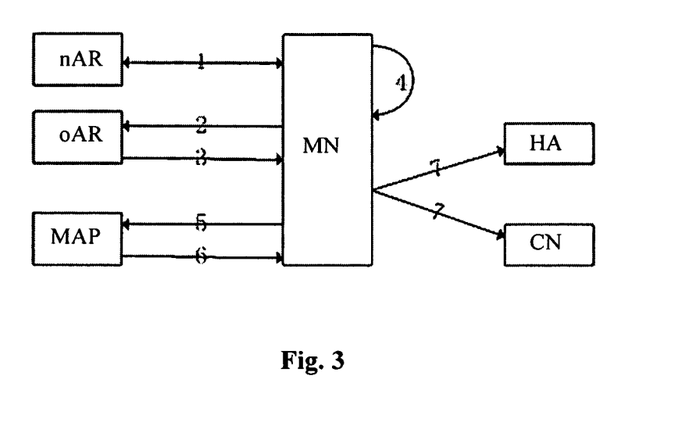
FIG. 3 shows a flow chart of an embodiment of the method according to the disclosure.

The flow chart of an embodiment of the method according to the disclosure is shown in FIG. 3, which includes the following steps:

Step 31: A MN acquires a link layer address or identifier information of a new Access Router (nAR) using a mechanism provided by the Link Layer.

If the access technology used in the Link Layer is the IEEE 802.11 standard access technology, the MN can obtain the identifier information of the nAR using a scan method for Link Layer.

Step 32: The MN transmits a Proxy Router Request message to a previous AR (pAR) of the MN, according to a handover expectation provided by the Link Layer. The Proxy Router Request message includes the acquired link layer address or identifier information of the nAR.

The handover expectation provided by the Link Layer is sent from the Link Layer to network layers above the Link Layer, and is expecting information indicating that the handover is to be performed on the network.

Step 33: Upon receiving the Proxy Route Request message, the pAR transmits to the MN a Proxy Router Advertisement message which has to include the information needed for the MN to configure a Care-of Address in the nAR domain, that is, a network prefix of the nAR for the stateless address configuration scheme.

The corresponding relationship between the link layer address or identifier information of the nAR and the information needed for the MN to configure the Care-of Address in the nAR domain has to be configured beforehand in the pAR. The configuration can be done manually by an administrator.

Step 34: The MN generates the new Care-of Address using the stateless address configuration scheme, according to the acquired network prefix of the nAR and the network interface identifier.

It differs from the existing standard hierarchical-based fast handover scheme for Mobile IPv6 in that in this procedure the following protocol operations may be performed without performing traditional Duplicate Address Detection operation.

Step 35: The MN transmits a local Binding Update message to the MAP of the MN before moving to a new network.

The Home Address option in the local Binding Update message is the current link address of the MN, and the Care-of Address option is the new Care-of Address configured at step 34.

Step 36: Upon receiving the local Binding Update message transmitted from the MN, the MAP transmits to the MN a Binding Acknowledge message as a response to the local Binding Update message transmitted from the MN. The Binding Acknowledge message is also sent to the previous link address where the MN originated and the current link address. Thus, it ensures that the MN will receive the Binding Acknowledge message, whether it has moved to the new network or is still located in the previous network.

The MN verifies the validity of the generated new Care-of Address using Optimistic Duplicate Address Detection after moving to the new network. The MN then receives the Binding Acknowledge message.

Step 37: If the state of the Binding Acknowledge message received by the MN is Failure, the handover of the MN has failed and the procedure is terminated; otherwise, if a handover within the MAP domain takes place, the handover of the MN is successful and the procedure is finished. If a handover across the MAP domains takes place, the MN has to send a Binding Update message to the HA and all CNs. After the HA and CNs return the Binding Acknowledge message, the handover of the MN is successful and the procedure is finished.

Figure 4:
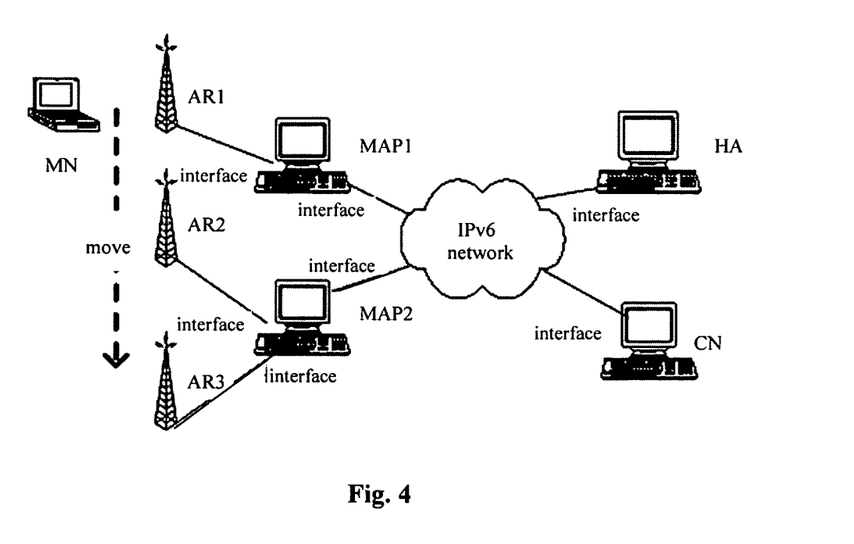
FIG. 4 is a schematic network topology of an embodiment according to the disclosure.

The disclosure also provides an embodiment of the method according to the disclosure; and the schematic network topology of the embodiment is shown in FIG. 4. The network configuration of the embodiment is as follows:

The IPv6 network address of the HA is 3ffe:0:0:1::1/64; and the home network address is 3ffe:0:0:1::/64.

The IPv6 home address of the MN is 3ffe:0:0:1::2/64.

The IPv6 network address of interface A of MAP1 is 3ffe:0:0:2::1/64; the IPv6 network address of interface B is 3ffe:0:0:2::2/64; and the network address of MAP1 domain is 3ffe:0:0:2::/64.

The network address responsible by the Access Router AR1 is 3ffe:0:0:4::/64. The AR1 and MAP1 are connected, that is, the AR1 is in the MAP1 domain.

The IPv6 network address of interface B of MAP2 is 3ffe:0:0:3::1/64; the IPv6 network address of interface B is 3ffe:0:0:3::2/64; the IPv6 network address of interface C is 3ffe:0:0:3::3/64; and the network address of MAP2 domain is 3ffe:0:0:3::/64.

The network address responsible by the Access Router AR2 is 3ffe:0:0:5::/64. The network address responsible by the Access Router AR3 is 3ffe:0:0:6::/64. AR2; AR3 and MAP2 are connected, that is, AR2 and AR3 are in the MAP2 domain.

The IPv6 network address of the CN is 3ffe:0:0:9::123/64.

HA, MAP1, MAP2 and CN are connected with each other through an IPv6 network.

In the network topology structure shown in FIG. 4, when MN moves from the AR1 domain to the AR2 domain, a handover across domains takes place and the detailed steps of the method according to the embodiment are as follows:

Step 1: The MN acquires the Link Layer address or identifier information of the new Access Router AR2 using a mechanism provided by the Link Layer.

Step 2: The MN transmits a Proxy Router Request message to the previous Access Router AR1 of the MN, according to a handover expectation provided by the Link Layer. The Proxy Router Request message includes the Link Layer address or identifier information of the AR2.

Step 3: Upon receiving the Proxy Route Request message, the AR1 transmits to MN a Proxy Router Advertisement message which has to include the information needed for MN to configure a Care-of Address in the AR2 domain, that is, a network prefix of the AR2 needed for the stateless address configuration scheme: 3ffe:0:0:5::/64.

Step 4: The MN generates the new Care-of Address: 3ffe:0:0:5:220:edff:feb4:505f/64, using the stateless address configuration scheme, according to the acquired network prefix of the AR2 and the network interface identifier.

Step 5: The MN transmits a local Binding Update message to the MAP2 before moving to a new network. In the local Binding Update message, the Home Address option is the current link address of the MN; and the Care-of Address option is the new Care-of Address configured at Step 4.

Step 6: The MAP2 transmits to the MN a Binding Acknowledge message as a response to the local Binding Update message transmitted from MN. The Binding Acknowledge message is also sent to the previous and current link addresses of MN, simultaneously.

MN verifies the validity of the generated new Care-of Address by use of a method for Optimistic Duplicate Address Detection after moving to the new network. MN then receives the Binding Acknowledge message.

Step 7: If the state of the Binding Acknowledge message received by the MN is Failure, the handover of the MN has failed and the procedure is terminated; otherwise, the MN has to send a Binding Update message to the HA and all the CNs (only one CN in this example). After the HA and CNs return the Binding Acknowledge message, the handover of the MN is successful and the procedure is finished.

In the network topology structure shown in FIG. 4, when the MN moves from the AR2 domain to the AR3 domain, a handover within the MAP domain takes place and the detailed steps of the method according to the embodiment are as follows:

Step 1: The MN acquires the Link Layer address or identifier information of the new Access Router AR3 using a mechanism provided by the Link Layer.

Step 2: The MN transmits a Proxy Router Request message to the previous Access Router AR2 of the MN, according to a handover expectation provided by the Link Layer. The Proxy Router Request message includes the Link Layer address or identifier information of the AR3.

Step 3: Upon receiving the Proxy Route Request message, AR2 transmits to MN a Proxy Router Advertisement message which has to include the information needed for MN to configure a Care-of Address in the AR3 domain, that is, a network prefix of the AR3 needed for the stateless address configuration scheme: 3ffe:0:0:6::/64.

Step 4: The MN generates the new Care-of Address: 3ffe:0:0:6:220:edff:feb4:505f/64, using the stateless address configuration scheme, according to the acquired network prefix of the AR3 and the network interface identifier.

Step 5: The MN transmits a local Binding Update message to the MAP2 before moving to a new network. In the local Binding Update message, the Home Address option is the current link address of the MN, and the Care-of Address option is the new Care-of Address configured at Step 4.

Step 6: The MAP2 transmits to the MN a Binding Acknowledge message, as a response to the local Binding Update message transmitted from the MN. The Binding Acknowledge message is also sent to the previous and current link addresses of the MN, simultaneously.

The MN verifies the validity of the generated new Care-of Address using the method for Optimistic Duplicate Address Detection after moving to the new network. The MN then receives the Binding Acknowledge message.

Step 7: If the state of the Binding Acknowledge message received by the MN is Failure, the handover of the MN has failed and the procedure is terminated; otherwise, the handover of the MN is successful and the procedure is finished.

What is claimed is:

1. A fast handover method for Hierarchical Mobile IPv6, comprising:
   transmitting, by a mobile node, a proxy route request message to a previous access router of the mobile node, according to a handover expectation provided by a link layer;
   generating, by the mobile node, a new care-of address, according to network prefix information of a new access router of the mobile node transmitted from the previous access router; wherein the network prefix information of the new access router is transmitted from the previous access router upon the previous access router receiving the proxy route request message;
   transmitting, by the mobile node, a local binding update message to a mobility anchor point of the mobile node before the mobile node moves to a target network with the new access router, wherein the local binding update message comprises a current link address and the new care-of address of the mobile node;
   transmitting, from the mobility anchor point, a binding acknowledge message to the mobile node in response to receiving the local binding update message transmitted from the mobile node;
   transmitting the binding acknowledge message to a previous link address where the mobile node originated and the current link address simultaneously; and
   performing, by the mobile node, an optimistic duplicate address detection on the new care-of address, after the mobile node moves to the target network, wherein a Success state carried in the binding acknowledge message by the mobile node indicates successful handover of the mobile node.

2. The method of claim 1, wherein, transmitting, by the mobile node, the proxy route request message to the previous access router of the mobile node comprises:
   obtaining, by the mobile node, a link layer address or identifier information of the new access router of the mobile node, using a mechanism provided by the link layer;
   transmitting, by the mobile node, the proxy route request message comprising the link layer address or identifier information of the new access router to the previous access router of the mobile node, according to the handover expectation provided by the link layer.

3. The method of claim 2, wherein, the process of obtaining, by the mobile node, the identifier information of the new access router of the mobile node comprises:
   obtaining, by the mobile node, the identifier information of the new access router of the mobile node by use of a link layer scan method.

4. The method of claim 2, further comprising:
   in the previous access router of the mobile node, configuring beforehand a corresponding relationship between the link layer address or identifier information of the new access router of the mobile node and information needed for the mobile node to configure the new care-of address in the new access router domain.

5. The method of claim 1, further comprising:
   finishing a handover operation according to the binding acknowledge message returned from the mobility anchor point in response to the local binding update message.

6. The method of claim 5, wherein generating the new care-of address comprises:
   generating, by the mobile node, the new care-of address using the stateless address configuration method, according to the network prefix information and network interface identifier of the new access router.

7. The method of claim 6, wherein the current link address of the mobile node is in a home address option of the local binding update message; and the new care-of address is in the care-of address option of the local binding update message.

8. The method of claim 6, wherein finishing the handover operation according to a binding acknowledge message returned from the mobility anchor point in response to the local binding update message comprises:
   transmitting, by the mobility anchor point, the binding acknowledge message to the previous link address and the current link address of the mobile node, upon receiving the local binding update message transmitted from the mobile node; and
   after the mobile node moves to the target network, receiving, by the mobile node, the binding acknowledge message;
   wherein, if the state of the binding acknowledge message is Failure, the handover of the mobile node has failed; otherwise, if it is a handover within a mobility anchor point domain, the handover of the mobile node is finished; if it is a handover across the mobility anchor point domains, the mobile node transmits the binding update message to the home address and all correspondent nodes; after receiving the binding acknowledge message returned from the home address and all correspondent nodes, the handover of the mobile node is finished.

9. The method of claim 1, wherein, the network prefix information of the new access router of the mobile node is transmitted by using a proxy router advertisement message.

10. A fast handover system for Hierarchical Mobile IPv6, comprising:
    an access router, configured to provide a network access point to a mobile node;
    a mobility anchor point, configured to support Hierarchical Mobile IPv6, process a local binding update of the mobile node, and transmit a binding acknowledge message to the mobile node; and
    the mobile node, configured to transmit a proxy route request message to a previous access router of the mobile node using a handover expectation provided by a link layer, generate a new care-of address according to a network prefix information of a new access router, to transmit to the mobility anchor point a local binding update message which comprises a current link address and the new care-of address of the mobile node before the mobile node moves to a target network with the new access router and to perform an optimistic duplicate address detection on the new care-of address after the mobile node moves to the target network, wherein
    upon receiving the local binding update message transmitted from the mobile node, the mobility anchor point transmits to the mobile node a binding acknowledge message as a response to the local binding update message, the binding acknowledge message is also sent to a previous link address where the mobile node originated and the current link address simultaneously, and a Success state carried in the binding acknowledge message by the mobile node indicates successful handover for the mobile node.

11. The system of claim 10, further comprising:

a home agent, configured to bind with the mobile node when the mobile node hands over across mobility anchor point domains;

a correspondent node, configured to communicate with the mobile node via IPv6 network and bind with the mobile node when the mobile node hands over across mobility anchor point domains.

12. The system of claim 10, wherein the mobile node comprises:

a module for transmitting a proxy route request message, configured to obtain a link layer address or identifier information of the new access router of the mobile node, using a mechanism provided by the link layer; and transmit a proxy route request message comprising the link layer address or identifier information of the new access router to a previous access router of the mobile node, according to the handover expectation provided by the link layer;

a module for processing a care-of address, configured to generate a new care-of address according to the network prefix information of the new access router received from the previous access router; transmit the local binding update message to the mobility anchor point of the mobile node before the mobile node moves to the target network; and perform the optimistic duplicate address detection on the new care-of address when the mobile node moves to the target network; and a handover processing module, configured to determine that the handover of the mobile node has failed when the state of a received binding acknowledge message Failure; otherwise, if it is a handover within the mobility anchor point domain, determine that the handover of the mobile node is finished; if it is a handover across mobility anchor point domains, transmit, by the mobile node, a binding update message to a home address and all correspondent nodes; and determine that the handover of the mobile node is finished after receiving a binding acknowledge message returned from the home address and all correspondent nodes.

* * * * *